(12) United States Patent
Cipolla et al.

(10) Patent No.: US 10,208,849 B2
(45) Date of Patent: Feb. 19, 2019

(54) MECHANICAL GEAR TRANSMISSION

(71) Applicant: GE AVIO S.r.l., Rivalta di Torino (IT)

(72) Inventors: Lorenzo Cipolla, Rivalta di Torino (IT); Giulio Zagato, Moncalieri (IT); Stefano Zecchi, La Loggia (IT)

(73) Assignee: GE AVIO S.R.L., Rivalta di Torino (IT)

( * ) Notice: Subject to any disclaimer, the term of this patent is extended or adjusted under 35 U.S.C. 154(b) by 193 days.

(21) Appl. No.: 15/501,067

(22) PCT Filed: Aug. 3, 2015

(86) PCT No.: PCT/IB2015/055890
§ 371 (c)(1),
(2) Date: Feb. 1, 2017

(87) PCT Pub. No.: WO2016/016877
PCT Pub. Date: Feb. 4, 2016

(65) Prior Publication Data
US 2017/0254407 A1    Sep. 7, 2017

(30) Foreign Application Priority Data

Aug. 1, 2014  (IT) .............................. TO2014A0624

(51) Int. Cl.
*F16H 57/04* (2010.01)
*F16H 1/28* (2006.01)

(52) U.S. Cl.
CPC .......... *F16H 57/0423* (2013.01); *F16H 1/28* (2013.01); *F16H 57/0486* (2013.01)

(58) Field of Classification Search
CPC .................... F16H 57/0423; F16H 57/0486
See application file for complete search history.

(56) References Cited

U.S. PATENT DOCUMENTS

| 5,107,676 A | 4/1992 | Hadaway |
| 8,740,740 B2 * | 6/2014 | McCune ................. F01D 5/027 475/159 |
| 2015/0361829 A1 * | 12/2015 | McCune ................. F01D 25/18 415/122.1 |

FOREIGN PATENT DOCUMENTS

| DE | 376381 C | 5/1923 |
| EP | 1890054 A1 | 2/2008 |
| FR | 2416379 A1 | 8/1979 |

(Continued)

OTHER PUBLICATIONS

International Search Report dated Dec. 1, 2015 for PCT application No. PCT/IB2015/055890.

*Primary Examiner* — Erin D Bishop
(74) *Attorney, Agent, or Firm* — Ohlandt, Greeley, Ruggerio & Perle, LLP

(57) ABSTRACT

In a mechanical gear transmission, a leaked lubricant liquid, used to lubricate an external ring gear meshing with at least one internal gear wheel, is collected and reintroduced in the system by means of a manifold having a first concave portion, which has a concavity facing towards the external ring gear, so as to house a mass of liquid moved outwards as a result of a centrifugal effect, and at least a second concave portion, which is designed to receive the leaked liquid and has a concavity facing towards the first concave portion; channelling walls being provided to channel the leaked liquid towards one or the other concave portion.

15 Claims, 4 Drawing Sheets

(56) References Cited

FOREIGN PATENT DOCUMENTS

GB 549207 A 11/1942
WO 2013124590 A1 8/2013

* cited by examiner

MECHANICAL GEAR TRANSMISSION

TECHNICAL FIELD

The present invention relates to a mechanical gear transmission, in particular for aeronautical purposes. In the aeronautical field, the use of traditional or epicyclic mechanical gear transmissions is very common.

BACKGROUND ART

As it is known, mechanical transmissions are cooled and/or lubricated with lubricant-refrigerant oils, so as to increase their duration and obtain, at the same time, reliability even in the case of particularly high transmitted powers.

Furthermore, as it is known, a part of the lubricant oil inevitably leaks out in an axial direction through the teeth and flows outwards as a result of a centrifugal effect. Therefore, in use, a flow of drawn oil is formed, which must be collected and led to the tank, not only to avoid fluid leaks and high managing costs, but also to prevent said drawn oil from becoming, in turn, a source of additional leaks caused by the drawn oil hitting the rotary elements of the transmission.

To this aim, it is known to use external collectors to collect and channel the drawn oil; the oil collected in said external collectors is quickly led towards the oil suction area, filtered and reintroduced in the system.

Known collection collectors, despite being able to partly fulfil the main function of collecting the drawn oil, have proven to be not good enough for the following reasons.

First of all, current collection collectors cannot avoid the formation of splashes and the return of the drawn oil towards the rotary elements and, in general, they are not able to limit fluid-dynamic leaks due to the drawn oil hitting the rotary organs.

In addition, known collection collectors are generally sized taking into account the nominal operating conditions of the transmission. For this reason, known collection collectors turn out to be ineffective when the transmission operates in so-called "off-design" conditions, namely with a rotation speed that is smaller than the nominal or normal operating rotation speed.

Finally, known collection collectors often require strict tolerances and clearances in the coupling with rotary parts that complicate both their manufacturing process and their assembly, often because of the need to provide mechanical seals to intercept oil splashes.

DISCLOSURE OF INVENTION

The object of the present invention is to provide a mechanical gear transmission, which has manufacturing features that help solve the above-mentioned problems in a simple and low-cost manner and, at the same time, besides being efficient and reliable, is also easy and economic to manufacture.

According to the present invention, there is provided a mechanical gear transmission as claimed in claim 1. Preferably, in the transmission described above, said first and second annular concave portions and said wall are integrally connected with each other.

BRIEF DESCRIPTION OF THE DRAWINGS

The invention will now be described with reference to the accompanying drawings, which show some non-limiting embodiments thereof, wherein.

BEST MODE FOR CARRYING OUT THE INVENTION

Figure 1:
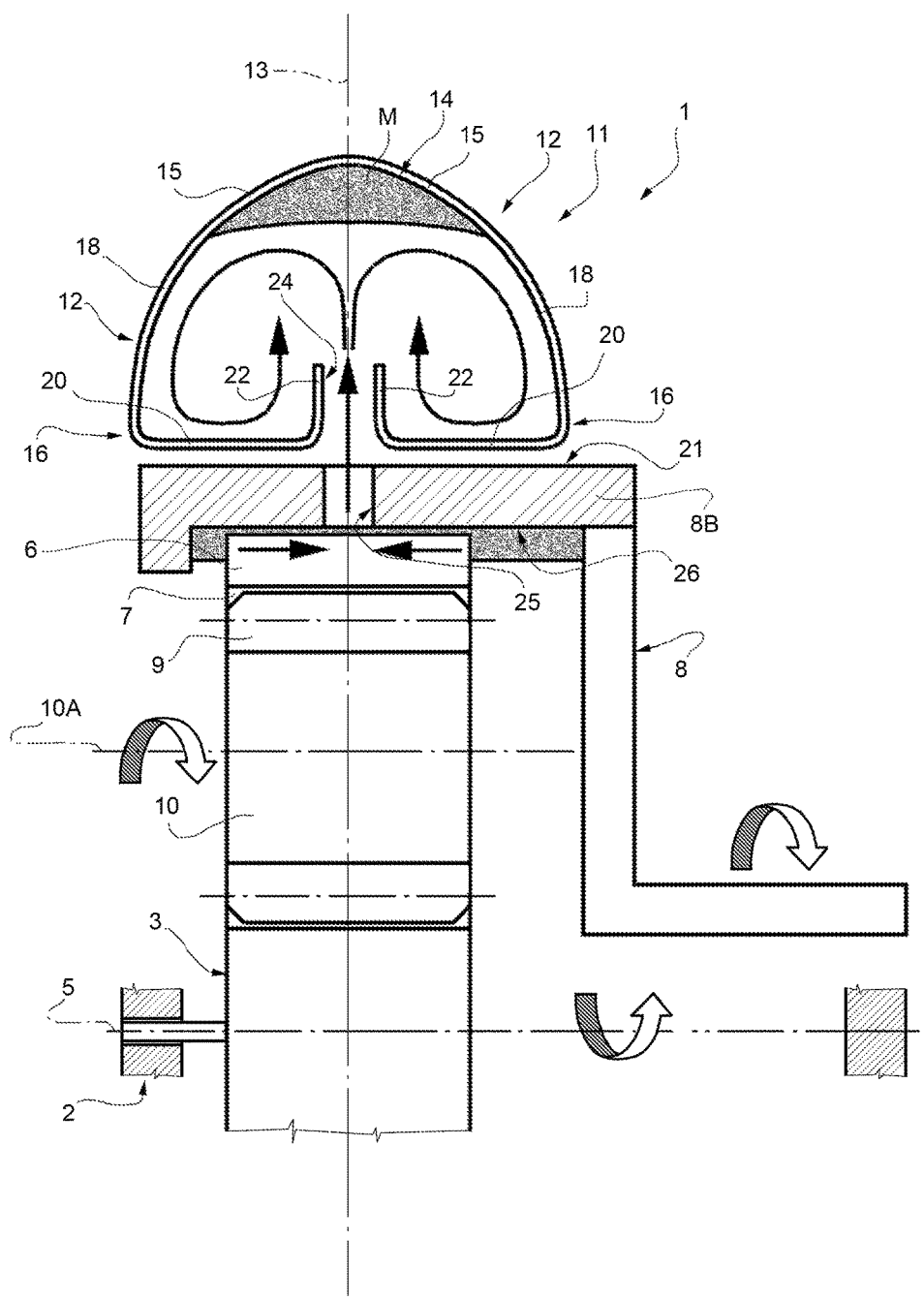
FIG. 1 schematically shows, substantially in blocks, a first preferred embodiment of a mechanical gear transmission manufactured according to the present invention.

In FIG. 1 number 1 indicates, as a whole, a mechanical gear transmission comprising a fixed support frame 2, which is partially shown, an internal ring gear 3, generally for the input of the motion, which is coupled to the frame 2 so as to rotate around a fixed axis 5 relative to the frame 2 itself.

The transmission 1 also comprises, an external ring gear 6, which is arranged coaxially to the axis 5 and has an internal toothing 7.

In FIG. 1, the ring gear 6 is coupled to the frame 2 by means of a rotary organ 8, which can rotate relative to the frame 2 around the axis 5 and comprises a single-piece tubular portion 8B, which houses, on the inside, and is integrally connected to the ring gear 6 in a known manner.

In the transmission 1, the toothing 7 of the ring gear 6 engages with the toothing 9 of one or more intermediate ring gears 10, which, in turn, engage with the central ring gear 3 and rotate around respective axis 10A, which are fixed relative to the frame 2 and parallel to the axis 5. With reference to FIG. 1, the transmission 1 comprises, finally, an annular collection collector or manifold 11 to collect the lubricant oil of the ring gears 3, 6 and 10.

The collection collector 11, which is part of a lubrication circuit for the ring gears, is defined by an annular hollow body, which is preferably manufactured in one single piece of metal material or is made up of different portions made of the same material or of different materials, which are connected to each other in a known manner.

The collection collector 11 is stably connected, in a known manner, to the frame 2 in a position surrounding the tubular portion 8B.

In the embodiment described herein, the collection collector 11 comprises two annular half-shells 12, which are mirror-like relative to a radial plane 13, which is orthogonal to the axis 5 and substantially passes through the middle of the ring gears 3 and 10. According to a variant that is not shown herein, the collection collector 11 does not have radial symmetry planes and the two half-shells are different from one another in terms of geometry and sizes, so as to adjust to the arrangement and to the manufacturing features of the ring gears.

In the embodiment described herein, the collection collector 11 comprises an external central concave portion 14, which is V-shaped and comprises, in turn, two sections 15, which extend starting from the plane 13 and each makes up part of a relative half-shell 12.

The portion 14 has a concavity turned towards the ring gear 6, so as to collect an oil mass M moved as a result of a centrifugal effect. The collection collector 11 also comprises, two lateral concave portions 16, which are arranged on opposite sides of the plane 13 and each makes up part of a respective half shell 12.

Each concave portion 16 has a concavity turned towards the concave portion 14, houses, in use, a relative lubricant oil mass, and is stably connected in a fluid-tight manner to a respective section 15 of the concave portion 14 itself by means of a relative wall 18 defining a deflector screen, which is designed to channel a part of the oil drawn or is present in the concave portion 14 on the inside of the respective concave portion 16.

With reference to FIG. 1, each concave portion 16 comprises a relative bottom wall 20, which faces and is arranged alongside an external circumferential surface 21 of the tubular portion 8, and a relative internal annular wall 22, which is disc-shaped, faces the wall 22 of the other concave portion 16 and delimits, with the other radial wall 22, a unidirectional radial passage 24 to guide the oil towards the inside of the collection collector 11. The passage 24 is radially aligned with a further radial passage 25, which is obtained through an external surface of the tubular portion 8B and communicates with a storage or transit chamber 26, which is obtained on the inside of the coupling element 8 and crosses the ring gear 6.

Figure 2:
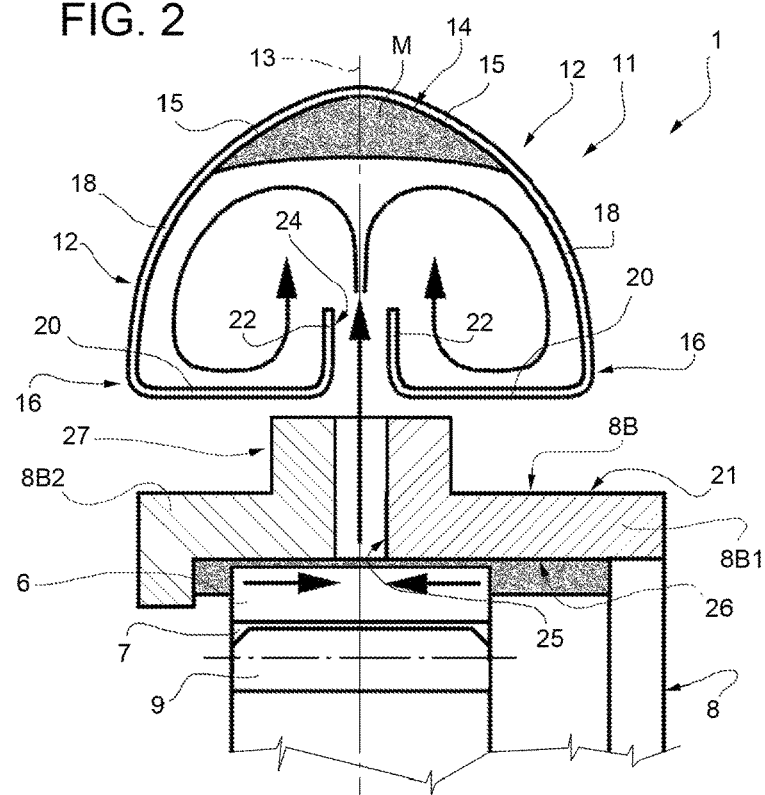
FIGS. 2 and 3 are similar to FIG. 1 and show two different variants of a detail of FIG. 1.

In the variant shown in FIG. 2, the tubular portion 8B consists of two tubular bodies 8B1 and 8B2, which are axially arranged alongside each other and are joined to each other by a known coupling 27. The passage 25 extends between the tubular bodies 8B1 and 8B2 and through the coupling 27.

Figure 3:
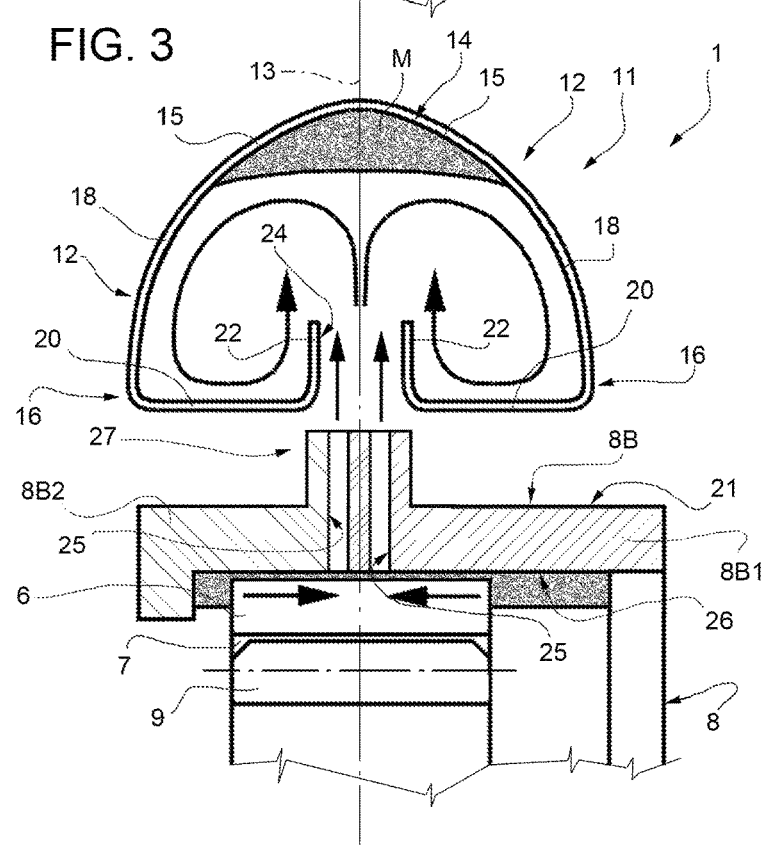

In the further variant shown in FIG. 3, two radial passages 25, which are arranged alongside each other in an axial direction, are obtained between the two tubular bodies 8B1 and 8B2 and through the coupling 27. According to a variant that is not shown herein, a plurality of passages 25 are obtained between or through the two bodies 8B1 and 8B2, so as to channel the oil present in the chamber 26 in the passage 24.

In use, during the rotation of the ring gear 6 at the normal running speed, a part of the lubricant oil is pushed, as a result of a centrifugal effect, towards the tubular portion 8B and into the chamber 26, from which it flows out through the passage/s 25 and enters the collection collector 11 through the passage 24, thus placing itself on the inside of the concave portion 14, as shown in FIGS. 1, 2 and 3. From the concave portion 14 the oil is then expelled, in a known manner, and reintroduced into the system.

When the rotation speed of the ring gear 6 and, hence, the ring gears 3 and 10 decreases, at least part of the oil mass contained in portion 14 falls, due to gravity, towards the ring gear 6, thus being collected in the concave portions 16.

Owing to the above, it is evident that, whatever the speed of rotation of the transmission, the drawn oil is always confined on the inside of the collection collector 11 and then returned, in a known manner, towards a collection area, from which it is reintroduced into the system, without significant leaks and without the risk for the drawn oil to come into contact with rotary parts of the transmission 1.

Figure 4:
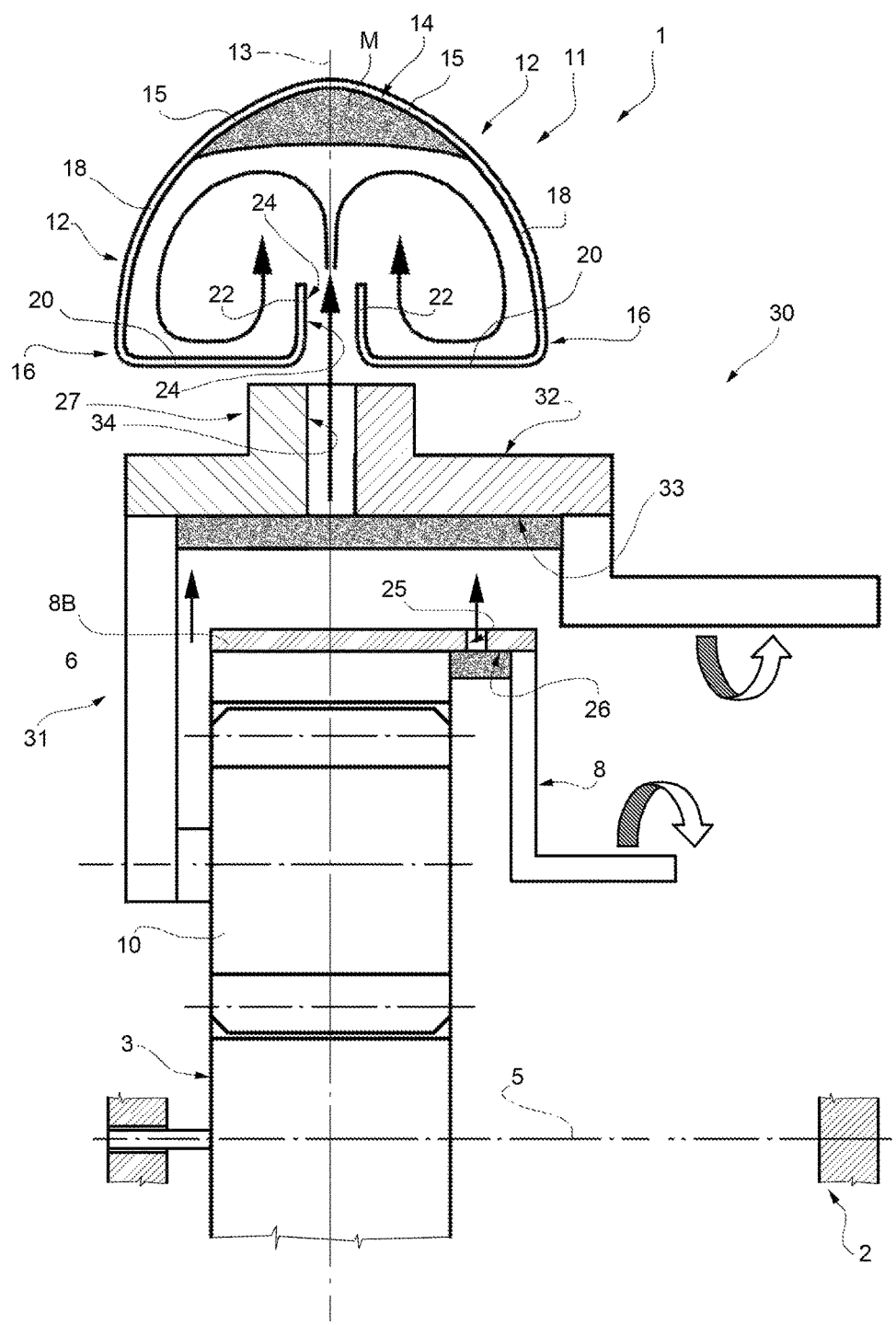
FIG. 4 schematically shows, substantially in blocks, a second preferred embodiment of a mechanical gear transmission manufactured according to the present invention.

The embodiment shown in FIG. 4 relates to a transmission 30, which differs from the transmission 1 of FIG. 1 because of some manufacturing details and whose parts are indicated, where possible, with the same reference numbers as the corresponding parts of the transmission 1.

In the transmission 30, the ring gear or the ring gears 10 are coupled to the frame 2 by means of a coupling element 31, which extends coaxial to the axis 5 and rotates around the axis 5 itself, preferably in a direction that is contrary to the direction of rotation of the coupling element 8 and corresponds to the direction of rotation of the ring gear 3.

The element 31 comprises a tubular portion 32, which extends between the collection collector 11 and the tubular body 8B coaxially to the axis 5. The tubular portion 32 has an internal diameter that is greater than the external diameter of the tubular body 8B and delimits an internal annular chamber 33, which is designed to house a lubricant liquid and communicates, on one side, with the passage 25 and, on the other side, with a passage 34, which, in turn, communicates with the passage 24. In this specific case, the chamber 26 is delimited by the tubular portion 8B and by the ring gear 6 and the passages 25 and 34 are axially not aligned.

Conveniently, the tubular portion 32 is made by means of two bodies axially arranged alongside, like the tubular portion 8B.

The particular way in which the collection collector 11 is designed, on the one hand, prevents the use of mechanical seals between the tubular portions 8B and 32 and the collection collector 11 and, on the other hand, makes it easier for the transmission to be assembled.

Figure 5:
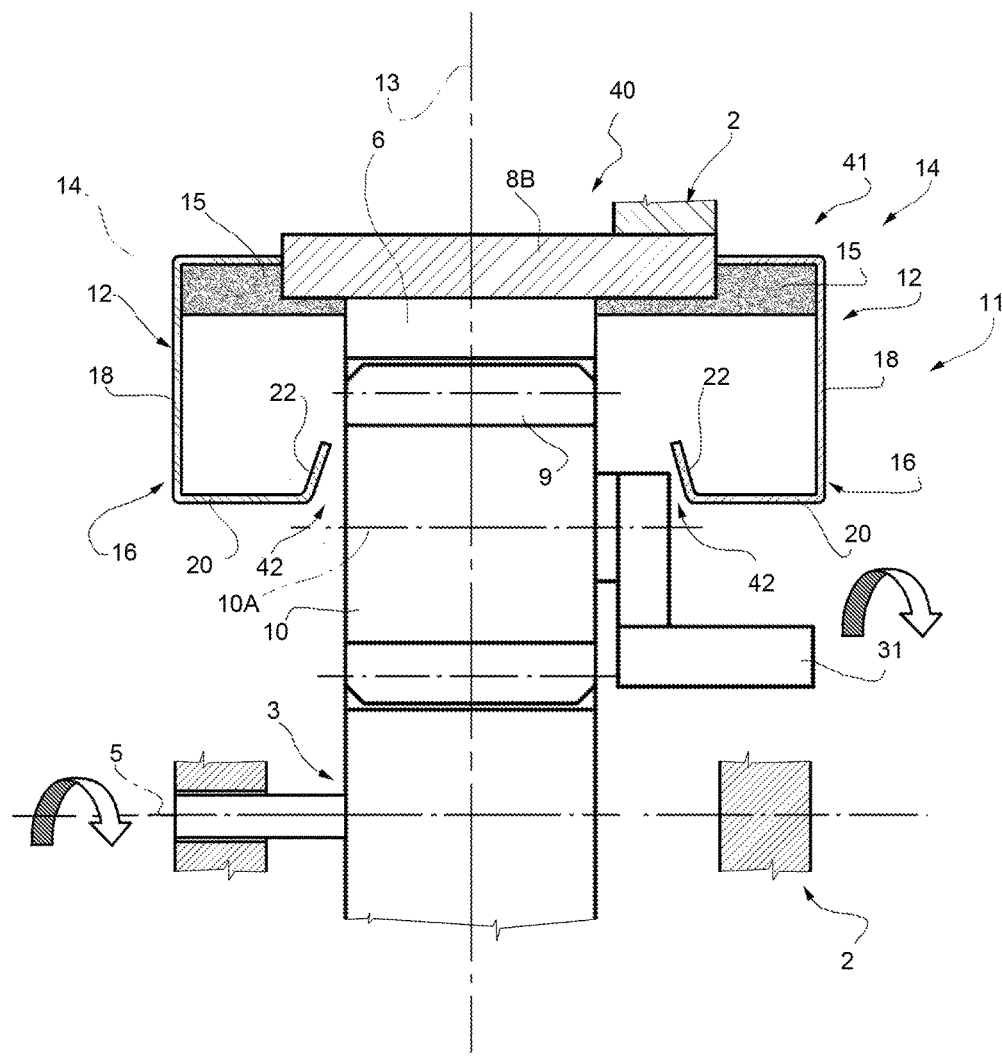
FIG. 5 schematically shows, substantially in blocks, a third preferred embodiment of a mechanical gear transmission manufactured according to the present invention.

The embodiment shown in FIG. 5 relates to a transmission 40, which differs from the transmission 30 because of some manufacturing details and whose parts are indicated, where possible, with the same reference numbers as the corresponding parts of the transmission 1.

In the transmission 40, the coupling element 8 is stably connected to the frame 2 so as to support the ring gear 6 in an axially and angularly fixed position relative to the frame 2 itself, whereas the coupling element 31 extends on the inside of the tubular portion 8B.

The transmission 40 comprises a collection collector 41, which differs from the collection collector 11 in that the two half-shells 12 are divided from each other along the radial plane 13, are moved apart from each other and from the plane 13, are arranged so as to project on opposite axial sides of the tubular portion 8B, and extend in positions facing the ring gear 6 and the ring gears 10, as shown in FIG. 5.

In particular, each half-shell 12 has its own section 15 integrally connected to a respective axial end of the tubular portion 8B, so as to define, with part of the tubular portion 8B itself and of the ring gear 6, a respective concave portion 14.

According to a variant that is not shown herein, one section 15 or both sections 15 is or are directly or indirectly connected to the frame 2.

Each half-shell 12 has its own concave portion 16 facing the ring gears 10 and its own wall 18, which practically faces the toothing 7 and 9 of the external ring gear 6 and of the ring gears 10.

As a consequence, each concave portion 16 is arranged with its bottom wall 20 substantially parallel to the axis 5 or slightly inclined relative to the axis 5 itself and, in this specific case, alongside the axes 10A and with its wall 22 extending towards the toothing 7 of the external ring gear 6 and towards the ring gears 10. In this way, each one of the walls 22 delimits, with the axial surfaces of the ring gears 10, a respective radial inlet passage 42 to let the drawn oil into the relative half-shell 12.

Conveniently, the passage 42 is tapered in a radial direction towards the external ring gear 6, so as to help the drawn oil get into the relative half-shell 12 as a result of a centrifugal effect and so as to inhibit or obstacle the outflow of oil from the relative half-shell 12 as the speed of rotation of the coupling element 31 and of the ring gears 10 decreases.

The presence of the walls 22 avoids any contact between the drawn oil and the ring gears 10 or the coupling element 31 after the oil has entered the relative half-shell 12, whereas the walls 18 intercept the oil splashes flowing out of the toothing 7, 9, thus channelling them into one or the other concave portion 14, 16.

Owing to the above, it is evident that transmissions 1, 30 and 40 described herein can be subject to changes and variations, without for this reason going beyond the scope of protection set forth in the independent claims.

In particular, there can be a different number or different types of ring gears and the half-shells 12 defining the collection collector 11 could be different in terms of geometry and/or sizes, but they are always such as to collect and hold the mass of drawn oil, whatever the speed of rotation, and to avoid any kind of return of the mass of drawn oil towards the movable part of the transmission, as the speed of rotation varies.

The invention claimed is:

1. A mechanical gear transmission comprising:
    a fixed support frame;
    a ring gear having an internal toothing;
    a coupling element fixed to said ring gear and coupled to said support frame so that said ring gear is coaxial to a fixed axis;
    at least one intermediate gear wheel meshing with the internal toothing of said ring gear and rotatable about a respective axis, which is parallel to said fixed axis;
    a lubricant liquid and an annular manifold, which is fixed with respect to said support frame and is designed to collect a leaked mass of said lubricant liquid;
said annular manifold comprising at least one first annular concave portion, which surrounds said fixed axis and said intermediate gear wheel, has a concavity facing towards said coupling element or said intermediate gear wheel and houses the mass of lubricant liquid leaked from said intermediate gear wheel and/or said ring gear as a result of a centrifugal effect;
wherein said annular manifold further comprises:
    at least one second annular concave portion suitable to receive at least part of the mass of leaked lubricant liquid; said second annular concave portion being radially arranged inwardly of said first annular concave portion, surrounding said fixed axis and having a concavity facing radially towards said first annular concave portion, and
    a channelling wall for intercepting and channelling said leaked lubricant liquid; said channelling wall being connected in a fluid-tight manner to said first annular concave portion, on one side, and to said second annular concave portion, on the opposite side, so as to channel said leaked lubricant liquid towards one or the other of said first and second annular concave portions.

2. The transmission according to claim 1, wherein said first and second annular concave portions and said channelling wall are integrally connected with each other.

3. The transmission according to claim 2, wherein said first and second annular concave portions and said channelling wall define an annular hollow body manufactured in a single piece or define several different parts made of the same material or of different materials.

4. The transmission according to claim 1, wherein said ring gear is rotatable with respect to said frame about said fixed axis, and wherein said first and second annular concave portions and said channelling wall are integrally connected to said frame and are radially arranged outwardly of said coupling element.

5. The transmission according to claim 4, wherein said second annular concave portion is one of two second annular concave portions arranged alongside each other along a direction that is parallel to said fixed axis; said second annular concave portions communicating with each other and both with said first annular concave portion.

6. The transmission according to claim 5, wherein said second annular concave portions delimit between each other a unidirectional radial inlet passage for said leaked lubricant liquid into said annular manifold; said passage communicating with at least one further passage made through at least said coupling element.

7. The transmission according to claim 6, wherein said coupling element comprises at least two portions and a connection joint coupling said two portions to each other; said further passage extending through said joint.

8. The transmission according to claim 6, wherein said coupling element delimits at least one collection chamber for said leaked lubricant liquid, said further passage communicating with said collection chamber.

9. The transmission according to claim 8, comprising a further coupling element coupling said intermediate gear wheel to said frame; said further coupling element delimiting a further collection chamber for said leaked lubricant liquid; said further chamber communicating with the collection chamber through said further passage and with said inlet passage through a through opening made through said further coupling element.

10. The transmission according to claim 9, wherein said further coupling element comprises at least two portions and a further connection joint coupling said two portions to each other; said through opening extending through said further joint.

11. The transmission according to claim 1, wherein said ring gear and said coupling element are fixed with respect to said frame, and in that said first and second annular concave portions and said channelling wall are integrally connected to said coupling element or directly to said frame.

12. The transmission according to claim 11, wherein said first annular concave portion is one of two first annular concave portions, said second annular concave portion is one of two second annular concave portions, and said channelling wall is one of two respective channelling walls; said first and second annular concave portions and said channelling walls defining a first and a second annular hollow body; said first and second annular hollow bodies being arranged on axially opposite sides of said ring gear.

13. The transmission according to claim 12, wherein said channelling walls at least partially extend in a position facing said internal toothing.

14. The transmission according to claim 12, wherein said second annular concave portions at least partially extend in a position facing said intermediate gear wheel.

15. The transmission according to claim 12, wherein at least one of said second annular concave portions delimits, with said intermediate gear wheel, an inlet passage for said leaked lubricant liquid into said annular manifold.

\* \* \* \* \*